United States Patent [19]

Heckelsberg

[11] 4,193,247
[45] Mar. 18, 1980

[54] PANEL MOUNTING CLIP

[75] Inventor: Robert E. Heckelsberg, Germantown, Tenn.

[73] Assignee: AMCA International Corporation, Hanover, N.H.

[21] Appl. No.: 875,533

[22] Filed: Feb. 6, 1978

[51] Int. Cl.² ............................................. E04D 1/34
[52] U.S. Cl. ...................................... 52/713; 52/520; 52/544; 403/72; 403/80; 403/206; 403/247
[58] Field of Search ............... 52/520, 528, 544, 547, 52/713, 712, 715, 718; 403/80, 72, 70, 68, 66, 52, 109, 112, 242, 247, 206, 252, 353

[56] References Cited

U.S. PATENT DOCUMENTS

| 1,882,105 | 10/1932 | Wender | 52/520 |
| 2,140,887 | 12/1938 | Tinnerman | 52/718 |
| 2,240,487 | 5/1941 | Benham | 52/718 X |
| 2,989,157 | 6/1961 | Mostoller | 52/404 |
| 3,853,227 | 12/1974 | Filipowski | 403/353 X |
| 3,889,437 | 6/1975 | Day et al. | 52/528 X |
| 3,998,019 | 12/1976 | Reinwall, Jr. | 52/545 |
| 4,034,532 | 7/1977 | Reinwall, Jr. | 52/520 |

FOREIGN PATENT DOCUMENTS 706575  3/1965  Canada ..................................... 52/544

Primary Examiner—Alfred C. Perham

[57] ABSTRACT

A panel mounting clip is adapted to connect metal roof panels to roof purlins and comprises a base part that is fastened to the purlin and a flexible tab part that is resiliently and slidably connected at one end to the base and at the other end is interlocked with the seamed sidewalls of the roof panels.

3 Claims, 7 Drawing Figures

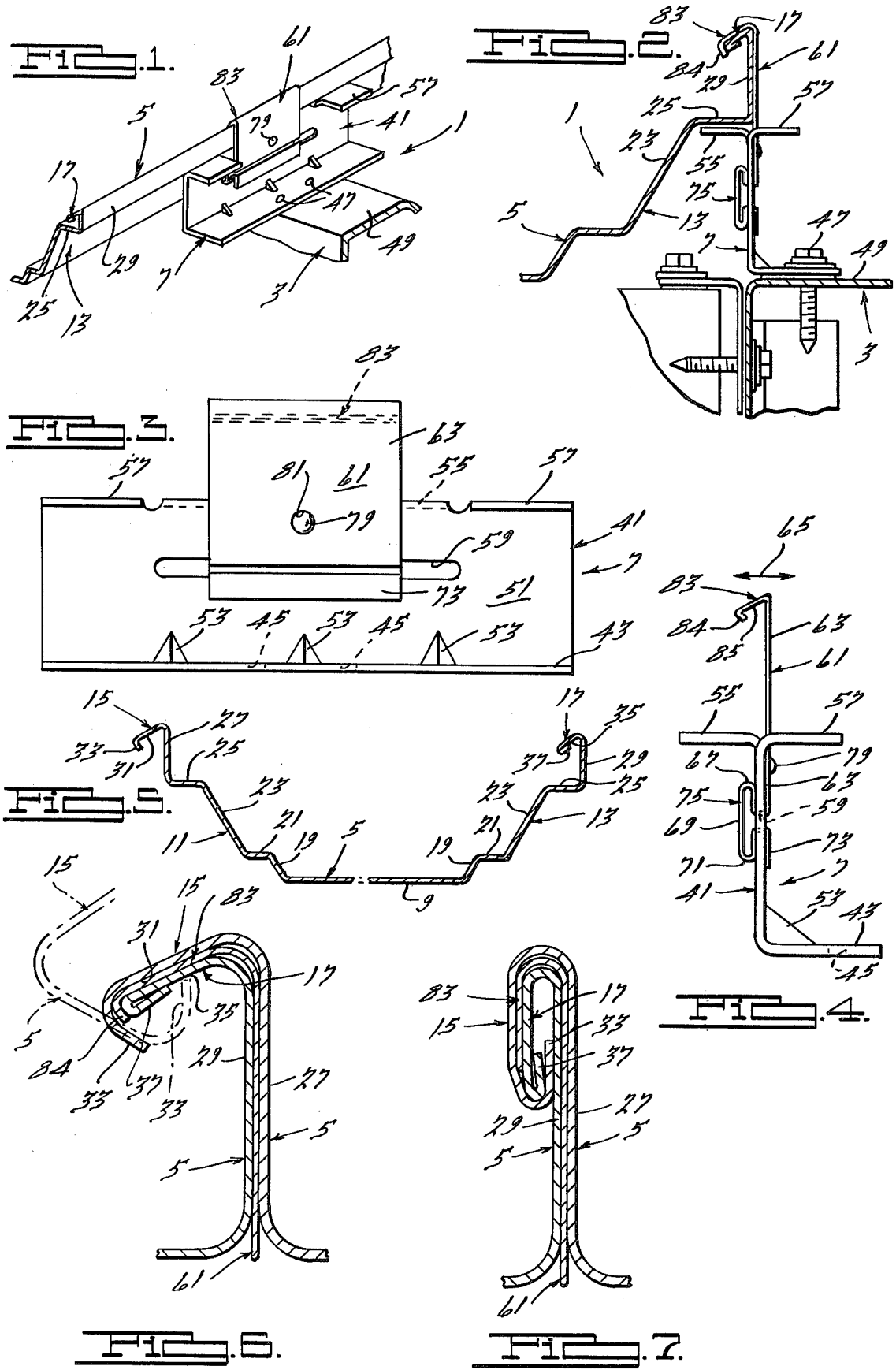

4,193,247

PANEL MOUNTING CLIP

RELATED APPLICATIONS

Copending applications Ser. Nos. 875,524 and 875,532 filed of even date herewith by applicant are directed to the metal panel and to the roof structure disclosed herein.

BRIEF SUMMARY OF THE INVENTION

It is a specific purpose of this invention to provide a panel mounting clip for fastening metal roof panels to roof purlins in a manner that will accommodate some relative movement of the panels and purlins. More generally, it is the purpose of the invention to provide a clip for attaching one elongaged member to another extending at right angles to it in such a manner that some self-adjustment in response to differential loads is accommodated.

In preferred form for use in attaching roof panels to roof purlins, a panel mounting clip according to the invention includes a base that may be fastened to a purlin and a flexible tab clip that may be interlocked with the sidewalls of the panels and is secured to the base in a manner that permits it to move relatively to it, both angularly and linearly, in order to accommodate relative movement of the panels with respect to the purlins while maintaining attachment of the panels to the purlins.

DESCRIPTION OF THE DRAWINGS

FIG. 1 is a simplified perspective view with parts broken away of a roof structure embodying the invention used to attach a panel to a purlin;

FIG. 2 is a cross section on an enlarged scale through the connection of clip, panel, and purlin shown in FIG. 1;

FIG. 3 is a side elevation on an enlarged scale of a panel mounting clip as shown in FIGS. 1 and 2;

FIG. 4 is an end view of the clip shown in FIG. 3;

FIG. 5 is a cross section through the panels of FIGS. 1, 2, 6, and 7;

FIG. 6 is a cross section through a panel—panel mounting clip—panel joint prior to seaming; and FIG. 7 is a cross section of the joint of FIG. 6 after seaming.

DESCRIPTION OF THE INVENTION

FIGS. 1 and 2 show fragments of a roof structure 1 that is described in more detail in my copending applications referred to above. The structure includes horizontally extending elongated roof purlins 3 and elongated metal roof panels 5 laid on the purlins at right angles to them. Panel mounting clips 7 in accordance with this invention flexibly secure the panels 5 to the purlins. It is understood that in a complete roof structure there will be a large number of parallel purlins 3, a large number of parallel panels 5 laid side by side and interconnected, and a large number of clips 7.

In accordance with the inventions of this and the aforementioned copending applications, the roof panels preferably have a special cross sectional configuration which not only strengthens them but enables adjacent panels to be movably interlocked or hinged and, later, to be tightly joined together in a common mechanical seam. The mechanical interlocks between adjacent panels in conjunction with the clips 7 hold them substantially in place while the remaining panels are being run and until seaming can be finished thereby minimizing the possibility of their disruption due to gusts of wind, etc.

Referring to FIG. 5, each panel 5 comprises a central bottom portion 9 and opposite sidewalls 11 and 13 extending upwardly and outwardly from the bottom 9 at angles of substantially 60° to it. The sidewalls 11 and 13 are substantially mirror images of each other, except for top flanges 15 and 17, respectively, and like features are therefore given the same reference numbers. Thus, the sidewalls 11 and 13 include outwardly slanted vertical bottom wall sections 19 having top ends which are joined by horizontal shelf sections 21 to the bottom ends of outwardly slanted, vertical, intermediate wall sections 23. Horizontal rims 25 extend outwardly from the top ends of the wall sections 23 and terminate at the bottom ends of seaming ribs 27 and 29 that form upper panel sections that extend, preferably, at right angles to a plane defined by the bottom wall 9. Ribs 27 are slightly higher than the ribs 29 so that flanges 15 will fit over the tops of flanges 17.

The top flanges 15 and 17 extend outwardly from the top of their respective ribs 27 and 29 at an angle of substantially 60°. The top flange 15 is a little wider than flange 17 and has an inner section 31 that extends outwardly and downwardly at an angle of substantially 60° to its rib 27 and an outer section or lip 33 that extends inwardly and downwardly at an angle of substantially 60° to the inner section 31 for a distance substantially as indicated by the dimensional relationship shown in FIGS. 6 and 7 so that a part of it will be vertically below a flange 17 after installation. The top flange 17 has an inner section 35 that extends inwardly and downwardly toward bottom 9 at an angle of substantially 60° to its rib 29 and an end section 37 that is doubled back to form a reversely bent bulb-like end edge portion for the flange 17.

Referring to the panel mounting clip 7 of the present invention, the construction of this member enables it to assist in holding the panels 5 in place after they are laid on the purlins 3. It includes means to permit the panels to expand and contract relative to the purlins 3 in response to temperature differentials and changes during the life of the roof thereby minimizing temperature induced roof stressing. The panel mounting clip 7 is preferably formed of sheet metal and has a channel shaped base member 41 with a lower horizontal flange 43 that has a pair of openings 45 in it whereby the clip may receive screw fasteners or the like 47 for attaching its bottom flange 43 to the top flange 49 of a purlin 3. The member 41 has a vertical web 51 and several gussets 53 may be pressed in it and in the bottom flange 43 at the corner between the web 51 and the flange 43 to provide rigidity to the bottom end of the clip 7. The top central portion of the web 51 of the base member 41 has a central shelf flange 55 which is parallel to the bottom flange 43 but which is bent to extend in the opposite direction. On either side of the shelf flange 55 and coplanar therewith at the opposite ends of the member 41 are a pair of shelf flanges 57 which extend in the same direction as the bottom flange 43 and are parallel to it. The flanges 55 and 57 provide shelves which fit beneath the rims 25 of the panels 5 to provide means on which the panels may be supported if their weight is not carried directly by support of bottoms 9 on the purlins 3.

The web 51 has a horizontal slot 59 extending through it which is substantially coextensive with the flange 55. A flap-like tab 61 is mounted on the web 51 in the slot 59 and is capable of sliding movement from one end of the slot to the other. Tab clip 61 is preferably formed of thinner metal than is the base member 41 and is somewhat resilient so that its vertical web portion 63 is biased toward the surface of web 51 but can also move transversely toward and away from it as illustrated by arrow 65. The bottom of the tab clip has a special resilient loop configuration which includes a reverse bend portion 67 that extends upwardly after passing through the slot 59 and is shaped to press against the back of the web 51 just as the bottom of the web 63 presses against the front side of web 51. The clip metal is reversely bent downwardly in a section 69 that extends to below the bottom of the slot 59 for a distance substantially equal to the length of the reverse bend section 67. The section 69 is then reversely bent into a section 71 corresponding to section 67 which engages the back side of the web 51 and extends through the bottom side of the slot 59 where it is reversely bent downwardly in an end section 73 for the tab clip 61 that engages the inside face of the web 51. The reverse bend sections 67 and 71 together with the section 69 form a resilient loop-like holding means 75 for the cantilever tab which clamps it to opposite sides of the web 51 but permits it to slide in the slot 59 between flanges 57. The horizontal spacing of the back section 69 from the reverse bends 67 and 71 and web 63 provides a spring action that tends to hold the tab clip 61 in a vertical position but also enables it to be translated slightly away from the web 51 in addition to having a hinge-like angular cantilever motion away from the web. Since the tab clip 61 is relatively thin it can also be bent resiliently to some extent in the direction of the flange 55.

While the tab clip 61 is capable of longitudinal movement with respect to the base member 41 it does have a center position along the midline of the member 7 and is yieldably held in this position by means of a dimple 79 that is embossed in the web 51 and adapted to seat in a hole 81 formed in the tab web 63, the dimple and hole forming a detent means. Substantial force tending to move the clip 61 in one direction or another along the slot 59 will overcome the spring pressure of the holding section 75 and enable the web 63 to ride over the dimple 79.

The top end of the tab clip 61 has a hook-like flange 83 which is very similar to panel flange 15. Thus, it has a section 85 that extends outwardly and downwardly at an angle of substantially 60° to the section 83 and terminates in an inwardly and downwardly extending lip 84. The height of the flange 83 above the plane of the top surfaces of flanges 55 and 57 is a little more than that of a flange 17 above a rim 25. The transverse length of the flange 83 is also a little more than that of flange 17. The flange dimensional relationships enable flanges 15, 83, and 17 to nest together and be interlocked and seamed as shown in FIGS. 2, 6, and 7.

In practical application of the invention to a roof structure 1 having purlins 3, a panel 5 is laid on the purlin 3 and panel mounting clips 7 are lined up with the right side wall 13 of the panel so that the flanges 55 fit under the rim 25, the tab clips 61 abut the upper section 29, and the top flange 83 and hook lip 84 extend over and around the flange 17. The actual connection can be made by hooking the flanges 83 on to the flange 17 and hinging the clips 7 around to the vertical position indicated. When this is done, holes are drilled in the purlin flanges 49 in alignment with the holes 45 in the bottom flanges 43 of the panel clips 7. Screws 47 are then threaded into these holes in the purlin to thereby firmly anchor the panel mounting clips to the purlin. This, of course, also anchors the side wall 3 of the panel 5 to the purlin 3 so that it cannot move upwardly away from it.

As illustrated by the phantom lines in FIG. 6, the next step in the assembly procedure is to attach another panel 5 in side by side relationship to the panel 5 that has just been anchored in place by panel mounting clips 7. This is done by interconnecting the side wall 11 of the second panel to the side wall 13 of the first and anchored panel. More particularly, it is done by placing the flange 15 over and around the flange 17 so that the stationary flange 17 is nested inside of the flange 15. This interconnection is accomplished by tilting the second panel 5 that is being attached at an angle to the horizontal so that the lip edge 33 can fit in the corner of the flange 17 as shown by the phantom lines in FIG. 6. When this relationship has been accomplished between the flange 15 and the flange 17, the panel 11 can be hinged in a clockwise manner until its bottom comes to rest against the surfaces 49 on the purlins 3. At this point the relationship between the flanges 15, 83, and 17 will be substantially as shown in full lines in FIG. 6. It will be seen that the lip 33 on the flange 15 lies vertically below the rebent end 37 of the flange 17 and consequently the two panels are interconnected in such a way that it is quite difficult to separate them by simple movements of one relative to the other such as might be caused by wind gusts, etc. It is unlikely that the second panel 5 will be disconnected or separated from the anchored panel 5 prior to seaming of the joint between them unless there is also angular unhinging movement of it to unhook its flange 15 from the mating flange 17.

After the second panel 5 has been hooked to and hinged around the anchored panel as just described, panel mounting clips 7 are hooked to its side wall 13 and secured in place by bolts 47 as already described for the first panel. This process of hooking a panel being added to the roof section to one already anchored on the roof section, hinging it down until it rests on the purlins 3, fastening the panel mounting clips 7 to the side wall 13 of the panel and then to the purlin 3, is repeated until all the panels 5 that it is desired to install are in place. It will be noted that in this condition the panel mounting clips 7 together with the loose hook type interlock between flange pairs 15 and 17 will integrate the panels so that they in fact form a unitary though flexible roof structure 1. This flexibility is then materially reduced by running a suitable seaming tool along the upright upper vertical rib sections 27 and 29 to bend the flanges 15, 83, and 17 together and against the inside face of upper section 29 on side wall 13 to achieve the compressed interlocked structure shown in FIG. 7. When this is done the lip 84 of the panel mounting clip tab 61 may in some structures be flattened out, as seen by comparing FIGS. 6 and 7, but this has no undesirable effect since it is apparent that the clip 7 still serves to resist movement of the joint in an upward direction away from the purlins 3. It does have a beneficial effect in that it makes it somewhat easier for the tab 61 to move longitudinally relative to the upper sections 27 and 29 of adjacent panels 5. Such relative movement is, as previously mentioned, accommodated by the slot 59, the spacing between flanges 57, the dimple 79, and the flexible holding means 75 of the panel mounting clip construction 7 and permits differential force systems introduced by temperature changes, pressure changes, etc. between interconnected panels to dissipate themselves in relative movement of the panels rather than in deformation or buckling of the panels. The resiliency of the tabs 61 also permits a series of interconnected panels 5 to have flexibility as a roof membrane relative to the purlins 3.

Thus, the panel mounting clips of this invention provide an improved means for fastening roof panels to roof purlins that facilitate assembly of the roof and add strength and flexibility to it. More broadly, the panel mounting clips may be used in other applications where it is desired to attach one member 5 to a second member 3 in such a manner that some relative movement between the members can occur without decreasing the integrity of the connection.

Modifications may be made in the specific structure shown without departing from the spirit and scope of the invention.

I claim:

1. A panel mounting clip assembly for interengagement with overengaged longitudinal edges of a pair of adjacent panel members and for attaching them to a panel support member, comprising a base member having a bottom flange adapted to be fastened to said support member and a web extending transversely to said bottom flange, said web having a slot therein extending substantially parallel to said bottom flange and to the length of a panel connected to the clip, a flexible tab having a holding portion formed therein and extending through said slot, said tab having a web on one side of said base member web and said holding portion having flange means on the other side of said base member web, said flange means and tab web resiliently gripping said base member web, said tab having a width substantially less than the length of said slot and being slidable along the length of the slot, said tab having an arm projecting as cantilever above said base member and adapted to interfit with and be crimped to said panel edges, said base member having shelf flange means extending laterally from and substantially perpendicularly to said first mentioned web at a position spaced from said bottom flange and interengageable with coacting rim portions on the panels to support the panels at positions spaced above said support member, said holding portion substantially filling the narrower dimension of the slot and being resilient in the direction of said narrower dimension.

2. A clip assembly as set forth in claim 1 wherein said holding portion comprises a resilient loop formed in said flexible tab.

3. A clip assembly as defined in claim 2 wherein said loop is in the general shape of the capital letter omega, one of the hook-like portions so defined constituting a continuation of the arm of the tab and being hooked under the upper edge of the slot in the base member to rigidly oppose upward movement of the arm, the other hook-like portion of the loop bearing yieldably against the lower edge of the slot and having a free end overlying the same side of the base member web as the tab web.

* * * * *

REEXAMINATION CERTIFICATE (1079th)
United States Patent [19]
Heckelsberg

[11] B1 4,193,247
[45] Certificate Issued  Jun. 20, 1989

[54] PANEL MOUNTING CLIP

[75] Inventor: Robert E. Heckelsberg, Germantown, Tenn.

[73] Assignee: AMCA International Corporation, Hanover, N.H.

Reexamination Request:
No. 90/000,346, Mar. 22, 1983

Reexamination Certificate for:
Patent No.: 4,193,247
Issued: Mar. 18, 1980
Appl. No.: 875,533
Filed: Feb. 6, 1978

[51] Int. Cl.⁴ .............................................. E04D 1/34
[52] U.S. Cl. ........................................ 52/713; 52/520; 52/544; 403/72; 403/80; 403/206; 403/247
[58] Field of Search ................. 52/520, 528, 404, 407, 52/544, 545, 547, 712, 713, 715, 743, 748, 478, 410

[56] References Cited
U.S. PATENT DOCUMENTS

| | | | |
|---|---|---|---|
| 2,989,157 | 6/1961 | Mostoller | 189/34 |
| 3,889,437 | 6/1975 | Day et al. | 52/520 |
| 3,998,019 | 12/1976 | Reinwall, Jr. | 52/478 |
| 4,034,532 | 7/1977 | Reinwall, Jr. | 52/520 |

FOREIGN PATENT DOCUMENTS
706575  3/1965  Canada.

OTHER PUBLICATIONS

Butler Manufacturing Company catalog, "Butler Building Systems", No. 13.1/Bu, 1973; No. 13.7/Bu, 1974; No. 13.6/Bu, 1975; No. 13.6/Bu, 1976.
The Griswold-Eshleman Co. News Release dated Mar. 26, 1969 referring to the New Product Press Conference of Butler Manufacturing Company (copy enclosed), with copies of photographs.
Wall Street Journal advertisement dated Apr. 14, 1970 for Butler Manufacturing Company.
Business Week advertisement dated Jul. 4, 1970 for Butler Manufacturing Company.
Plant Engineering advertisement dated Jul. 11, 1970 for Butler Manufacturing Company.
Butler Manufacturing Company brochure "MR-24 The Invulnerable Roof by Butler", Form No. 2867-3-69.
Butler Manufacturing Company brochure "A New View from the Rooftops", Form No. 2868-3-69.
Butler Manufacturing Company brochure "The Landmark System . . . Prelude to Beautiful Buildings", Form No. 2864-3-69.

Primary Examiner—Carl Friedman

[57] ABSTRACT

A panel mounting clip is adapted to connect metal roof panels to roof purlins and comprises a base part that is fastened to the purlin and a flexible tab part that is resiliently and slidably connected at one end to the base and at the other end is interlocked with the seamed sidewalls of the roof panels.

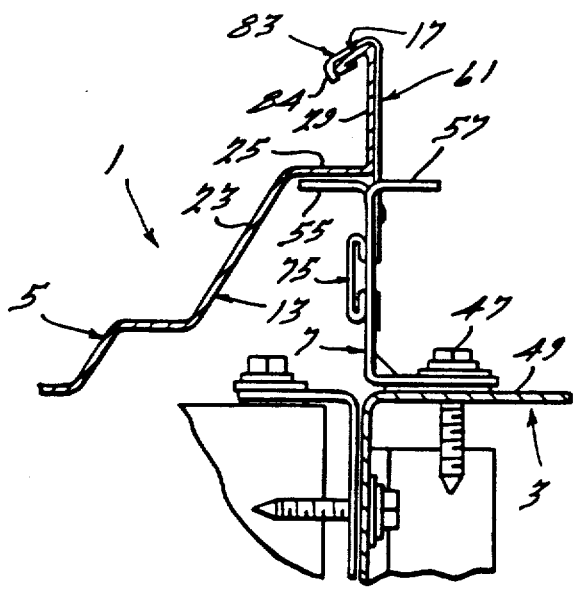

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

* * * * *